(12) United States Patent
Nicholson et al.

(10) Patent No.: US 11,630,690 B2
(45) Date of Patent: Apr. 18, 2023

(54) SIMPLIFYING DATA MAPPING IN COMPLEX FLOWS BY DEFINING SCHEMAS AT CONVERGENCE POINTS IN A WORKFLOW

(71) Applicant: INTERNATIONAL BUSINESS MACHINES CORPORATION, Armonk, NY (US)

(72) Inventors: Rob Nicholson, Southsea (GB); Sarah Burwood, Hursley (GB); Robert W. Phippen, Romsey (GB); Peter A. Broadhurst, Eastleigh (GB); Gary Thornton, Winchester (GB); Rob Breeds, Swindon (GB)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 15/846,748

(22) Filed: Dec. 19, 2017

(65) Prior Publication Data
US 2019/0188035 A1     Jun. 20, 2019

(51) Int. Cl.
*G06F 9/48*     (2006.01)
*H04L 67/12*    (2022.01)
(Continued)

(52) U.S. Cl.
CPC ....... *G06F 9/4881* (2013.01); *G06Q 10/0633* (2013.01); *H04L 67/10* (2013.01);
(Continued)

(58) Field of Classification Search
CPC ...... G06F 9/4881; G06F 3/04842; G06F 8/60; G06F 2209/482; H04L 67/12; H04L 67/10; G06Q 10/0633
(Continued)

(56) References Cited

U.S. PATENT DOCUMENTS 6,834,301 B1 * 12/2004 Hanchett ............. H04L 41/0233
                                                    705/1.1
7,177,877 B2    2/2007 Nuyens et al.
(Continued)

OTHER PUBLICATIONS

Alexe et al., "Simplifying Information Integration: Object-Based Flow-of-Mappings Framework for Integration", https://people.cs.umass.edu/~barna/paper/birte.pdf, accessed Nov. 28, 2017, 15 pages.
(Continued)

*Primary Examiner* — S. Sough
*Assistant Examiner* — Zengpu Wei
(74) *Attorney, Agent, or Firm* — Aaron Pontikos; Andrew D. Wright; Calderon Safran & Cole, P.C.

(57) ABSTRACT

A computer-implemented method comprising: receiving, by a computing device, user input defining a workflow; receiving, by the computing device, information defining schemas at convergence points in the workflow; determining, by the computing device, a set of mapping parameters at outputs of nodes of the workflow based on the schemas; receiving, by the computing device, input values to the mapping parameters; storing, by the computing device, the input values to the mapping parameters in a structure corresponding to the schemas; and executing, by the computing device, the workflow based on the input values to the mapping parameters, wherein the executing includes invoking one or more applications residing on one or more application servers through application programming interface (API) calls.

17 Claims, 9 Drawing Sheets

(51) Int. Cl.
 *G06Q 10/06* (2012.01)
 *H04L 67/10* (2022.01)
 *G06F 8/60* (2018.01)
 *G06F 3/04842* (2022.01)
 *G06Q 10/0633* (2023.01)

(52) U.S. Cl.
 CPC .......... *H04L 67/12* (2013.01); *G06F 3/04842* (2013.01); *G06F 8/60* (2013.01); *G06F 2209/482* (2013.01)

(58) Field of Classification Search
 USPC ........................................................ 717/105
 See application file for complete search history.

(56) References Cited

U.S. PATENT DOCUMENTS

| | | | |
|---|---|---|---|
| 7,689,582 B2 | 3/2010 | Behnen et al. | |
| 7,987,159 B2 | 7/2011 | Gopal et al. | |
| 8,538,912 B2 | 9/2013 | Simitsis et al. | |
| 8,943,461 B2 | 7/2015 | Patrascu et al. | |
| 9,251,225 B2* | 2/2016 | Stanfill | G06F 16/25 |
| 2003/0023773 A1* | 1/2003 | Lee | G06F 9/541 |
| | | | 719/328 |
| 2004/0215472 A1* | 10/2004 | Gleckman | G06Q 10/107 |
| | | | 709/206 |
| 2006/0129443 A1* | 6/2006 | Chen | G06F 8/34 |
| | | | 715/771 |
| 2007/0198565 A1* | 8/2007 | Ivanov | G06F 40/169 |
| 2009/0164593 A1* | 6/2009 | Birsan | G06Q 10/107 |
| | | | 709/206 |
| 2012/0151027 A1* | 6/2012 | Banks | H04L 12/6418 |
| | | | 709/223 |
| 2013/0326526 A1* | 12/2013 | Sasaki | G06F 9/46 |
| | | | 718/102 |
| 2014/0032617 A1* | 1/2014 | Stanfill | G06F 16/25 |
| | | | 707/809 |
| 2014/0337071 A1* | 11/2014 | Stiffler | G06Q 10/06311 |
| | | | 705/7.13 |
| 2015/0081620 A1 | 3/2015 | Reddy et al. | |
| 2016/0154896 A1* | 6/2016 | Simitsis | G06F 16/2372 |
| | | | 707/741 |
| 2016/0313874 A1* | 10/2016 | Mikheev | G06Q 10/0633 |
| 2018/0053328 A1* | 2/2018 | Simonovic | G06F 8/433 |

OTHER PUBLICATIONS

Anonymous, "A Growing Need for Integration Tools", https://www.mulesoft.com/resources/esb/integration-tools-solutions, MuleSoft, accessed Mar. 3, 2017, 2 pages.

Mell et al., "The NIST Definition of Cloud Computing", NIST, Special Publication 800-145, Sep. 2011, 7 pages.

* cited by examiner

SIMPLIFYING DATA MAPPING IN COMPLEX FLOWS BY DEFINING SCHEMAS AT CONVERGENCE POINTS IN A WORKFLOW

BACKGROUND

The present invention generally relates to simplifying data mapping in complex flows and, more particularly, to simplifying data mapping in complex flows by defining schemas at convergence points in a workflow.

A workflow may include a series of nodes or tasks that may each invoke an application, application programming interface (API) call, HTTP GET/PUT/POST requests, etc. A workflow may include a series of conditional points that direct data flows down different paths depending on the conditions met. The data present in the workflow and available to be sent to applications as part of a request may depend on the path that a data flow took to arrive at the node.

SUMMARY

In an aspect of the invention, a computer-implemented method includes: receiving, by a computing device, user input defining a workflow; receiving, by the computing device, information defining schemas at convergence points in the workflow; determining, by the computing device, a set of mapping parameters at outputs of nodes of the workflow based on the schemas; receiving, by the computing device, input values to the mapping parameters; storing, by the computing device, the input values to the mapping parameters in a structure corresponding to the schemas; and executing, by the computing device, the workflow based on the input values to the mapping parameters, wherein the executing includes invoking one or more applications residing on one or more application servers through application programming interface (API) calls.

In an aspect of the invention, there is a computer program product for data mapping in complex flows. The computer program product includes a computer readable storage medium having program instructions embodied therewith, the program instructions executable by a computing device to cause the computing device to: receive, via a user interface of a workflow management application, user input for constructing a workflow; receive, via the user interface, user input that defines schemas at convergence points in the workflow; receive, via the user interface, input values to mapping parameters defining output data at nodes in the workflow; store the input values to the mapping parameters in a structure corresponding to the schemas at respective nodes; and execute the workflow based on the input values to the mapping parameters.

In an aspect of the invention, a system includes: a CPU, a computer readable memory and a computer readable storage medium associated with a computing device; program instructions to present a workflow having a plurality of convergence points; program instructions to present a plurality of schema definition dialogue boxes, wherein each of the plurality of schema definition dialogue boxes receive user inputs for defining a schema at a respective convergence point; program instructions to present a plurality of data mapping dialogue boxes, wherein each of the plurality of data mapping dialogue boxes receive user inputs for defining data mapping values at a respective output of a node in the workflow, wherein the data mapping values are structured in accordance with the schema; and program instructions to execute the workflow based on the data mapping values. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to simplifying data mapping in complex flows and, more particularly, to simplifying data mapping in complex flows by defining schemas at convergence points in a workflow. A workflow may include a series of conditional points that direct the flow of execution of the flow down different paths depending on the conditions met. The data present in the memory context of the workflow and available to be sent to applications as part of a request may depend on the path that an execution of the flow took to arrive at the node. Typically, a user may need to define a mapping from the data present in the context of each path of data to the request parameters for an interaction with an application. If the flow represents an HTTP request—response then a special case of this is mapping data into the response node (e.g., endpoint node). Thus, if four independent conditionals are present in the workflow, sixteen paths may be present in the workflow, and thus the user would need to correctly map 16 types of responses based on which path the data flow took to arrive at the endpoint. If eight conditionals are present in the workflow, the user may need to correctly map 256 types of responses, which would be time-consuming, laborious, and error prone since the user would be required to consider and analyze how to map each data output by each node in the workflow. For more complex workflows with even more conditionals, mapping responses could not be performed manually. Accordingly, aspects of the present may simplify and significantly reduce the number of data mappings a user must define in a workflow having a series of multiple conditionals, thereby allowing for the use of more complex workflows to improve the performance of applications and computer systems that utilize the workflows.

As described herein, aspects of the present invention may identify convergence points in a workflow (e.g., an ENDIF or ENDCASE point), receive schema parameters for each convergence point from a user, and receive data mapping input values that conform the schema (e.g., are stored in a structured corresponding the schema). The data mappings and schema may then be stored and used to subsequently define data mappings for other outputs in the workflow. Further, the data mappings and schema may also be used to auto-populate other data mappings for outputs in the workflow. In this way, the number of data mappings that the user is required to manually determine and map is significantly reduced, particularly when a workflow contains several conditional points in a series.

As described herein, aspects of the present invention may eliminate the need to manually map response data for each path in a workflow. Instead, only data at outputs of nodes may need to be mapped, and only schemas at convergence points may need to be mapped. Further, mapped data at one output in the workflow can be used to auto-populate data at another output in the workflow. As a result, the amount of data that is needed to be mapped is significantly reduced in relation to when data is mapped to each path in the workflow. Specifically, a number of points in the workflow in which a user may define schemas an input mapping values is substantially less than a number of paths in the workflow.

Aspects of the present invention may be applied to a workflow associated with any variety of applications. For example, aspects of the present invention may be applied to workflow for e-mail/communications applications, e-commerce applications, banking/financial applications, gaming applications, social media applications, content streaming applications, data processing applications, data records generation and storage applications, security applications, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
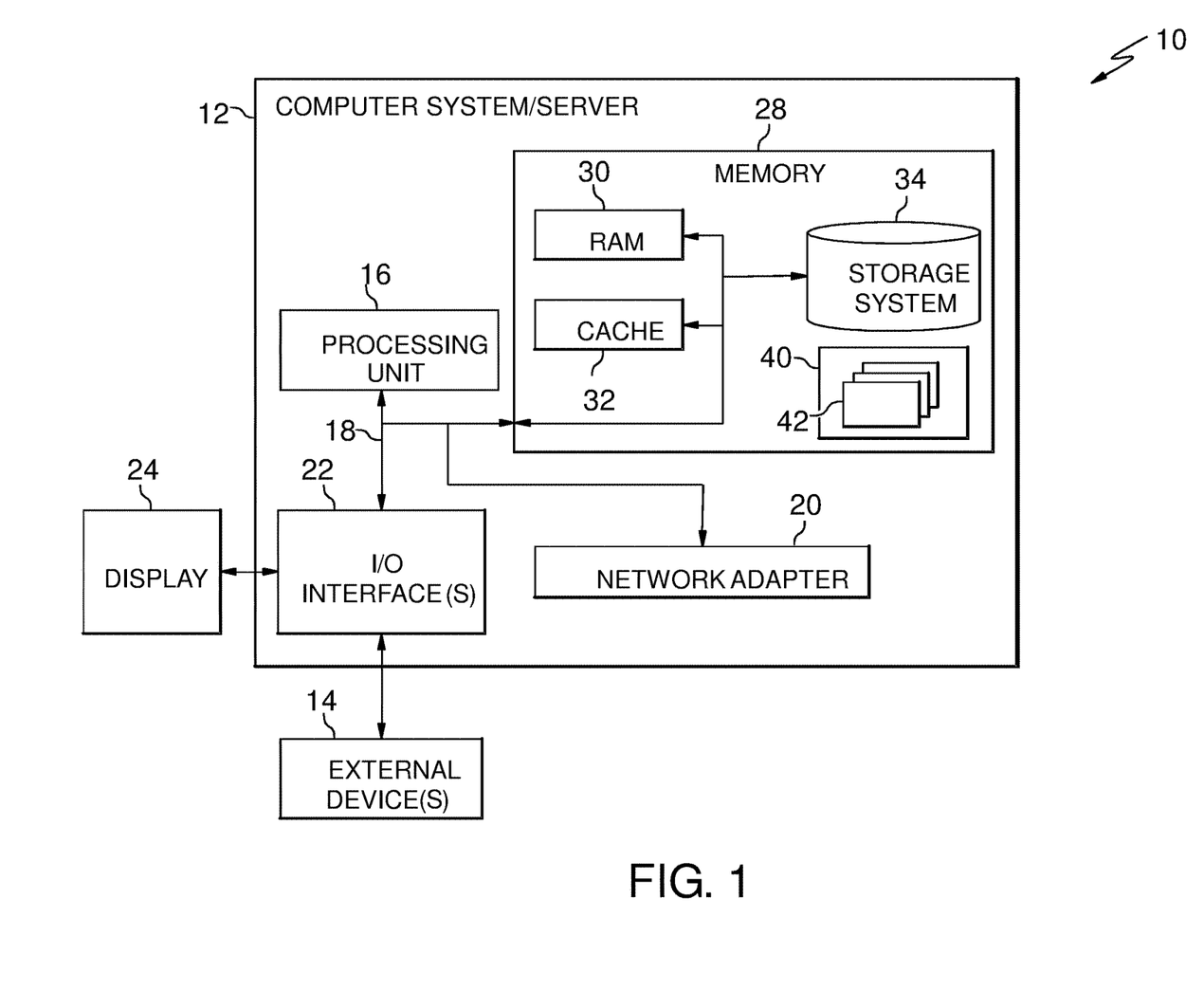
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
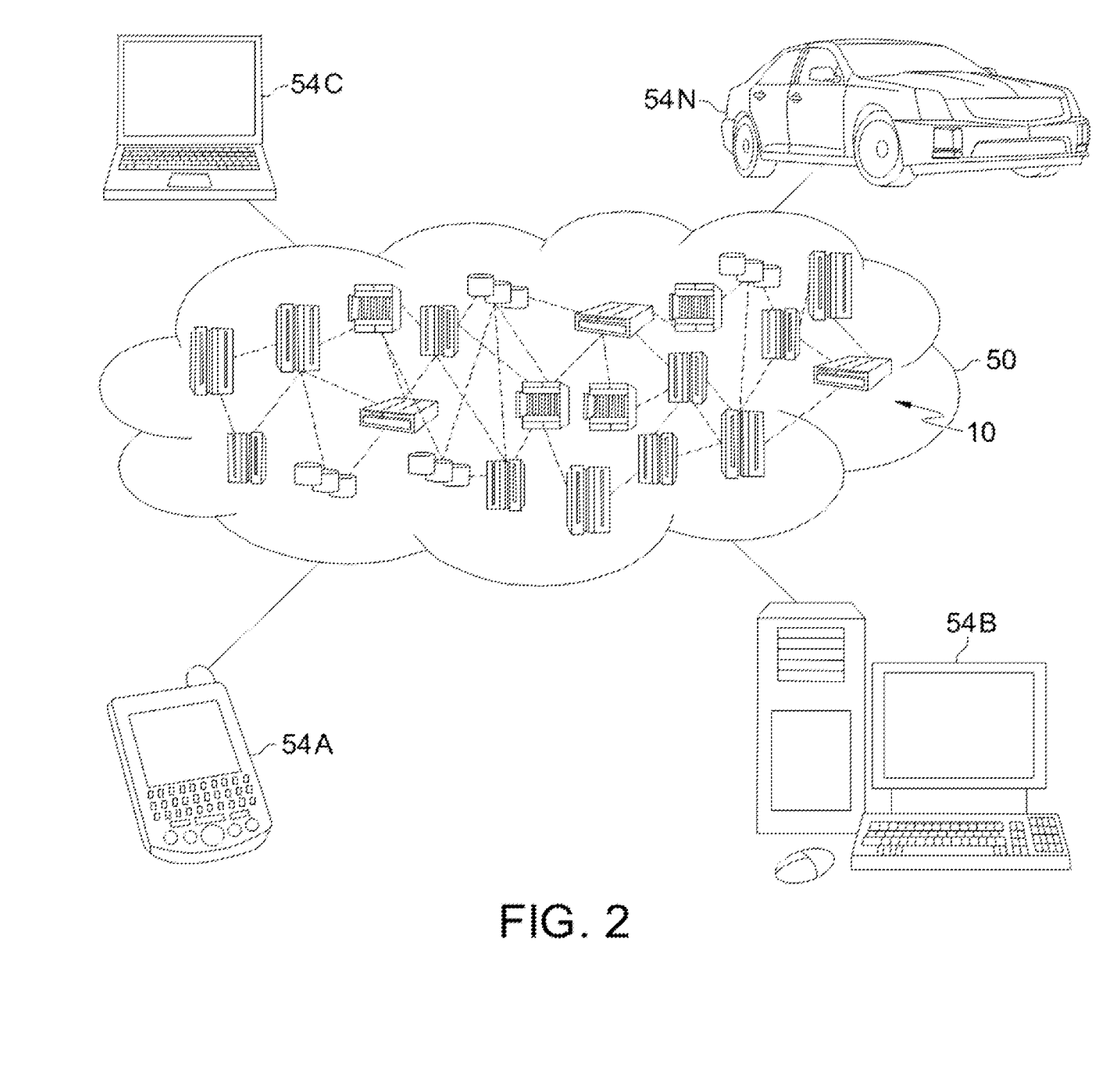
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
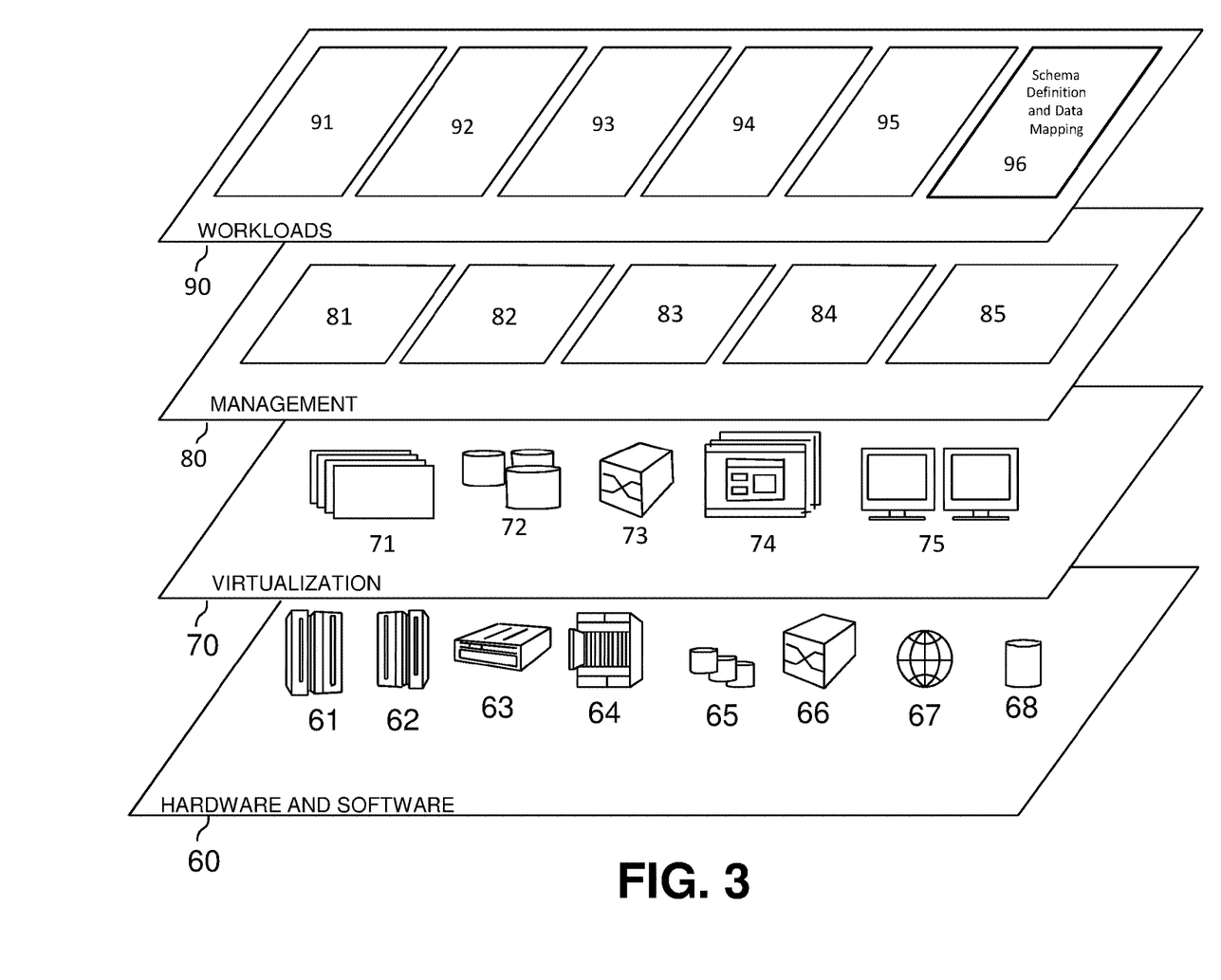
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and schema definition and data mapping 96.

Figure 5:
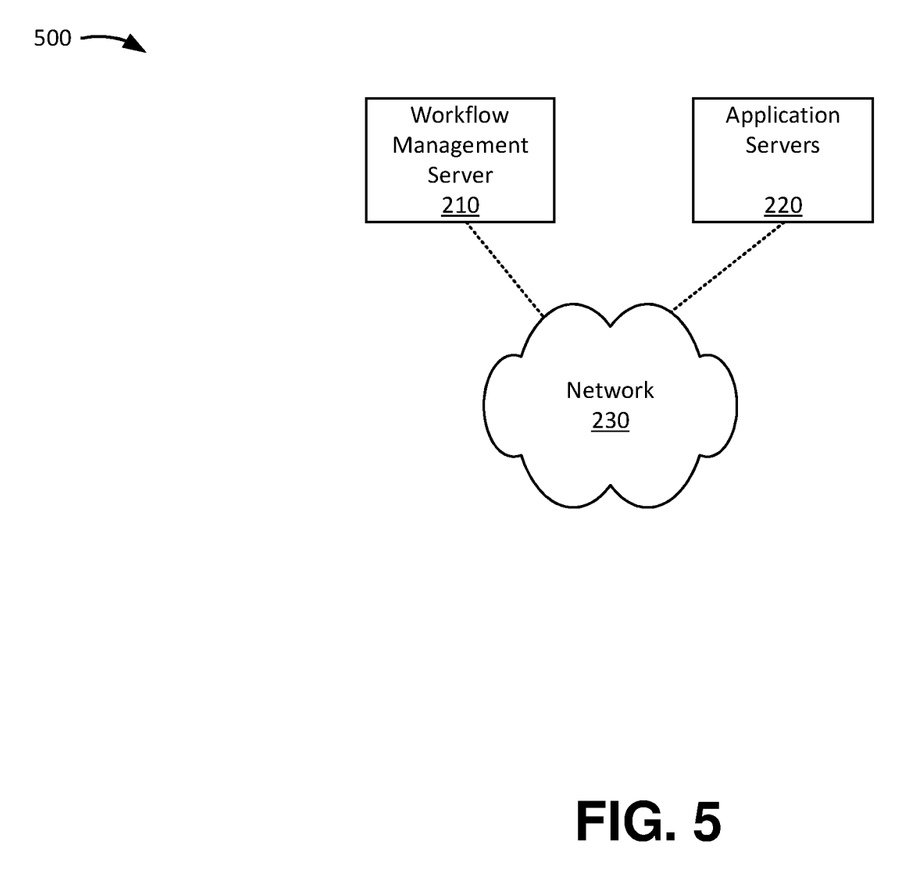
FIG. 5 shows an example environment in accordance with aspects of the present invention.

Referring back to FIG. 1, the program/utility 40 may include one or more program modules 42 that generally carry out the functions and/or methodologies of embodiments of the invention as described herein (e.g., such as the functionality provided by schema definition and data mapping 96). Specifically, the program modules 42 may receive workflow parameters, present schema definition input dialogue at convergence points, receive input defining schemas at the convergence points, determining a set of mapping parameters to present to the user based on the previously defined schemas, receive mapping values, store the mapping values in accordance with the schema for use in other workflow mappings, and auto-populate other mapping values at convergence point using the schemas and previously inputted mapping values. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a workflow management server 210 as shown in FIG. 5.

Figure 4A:
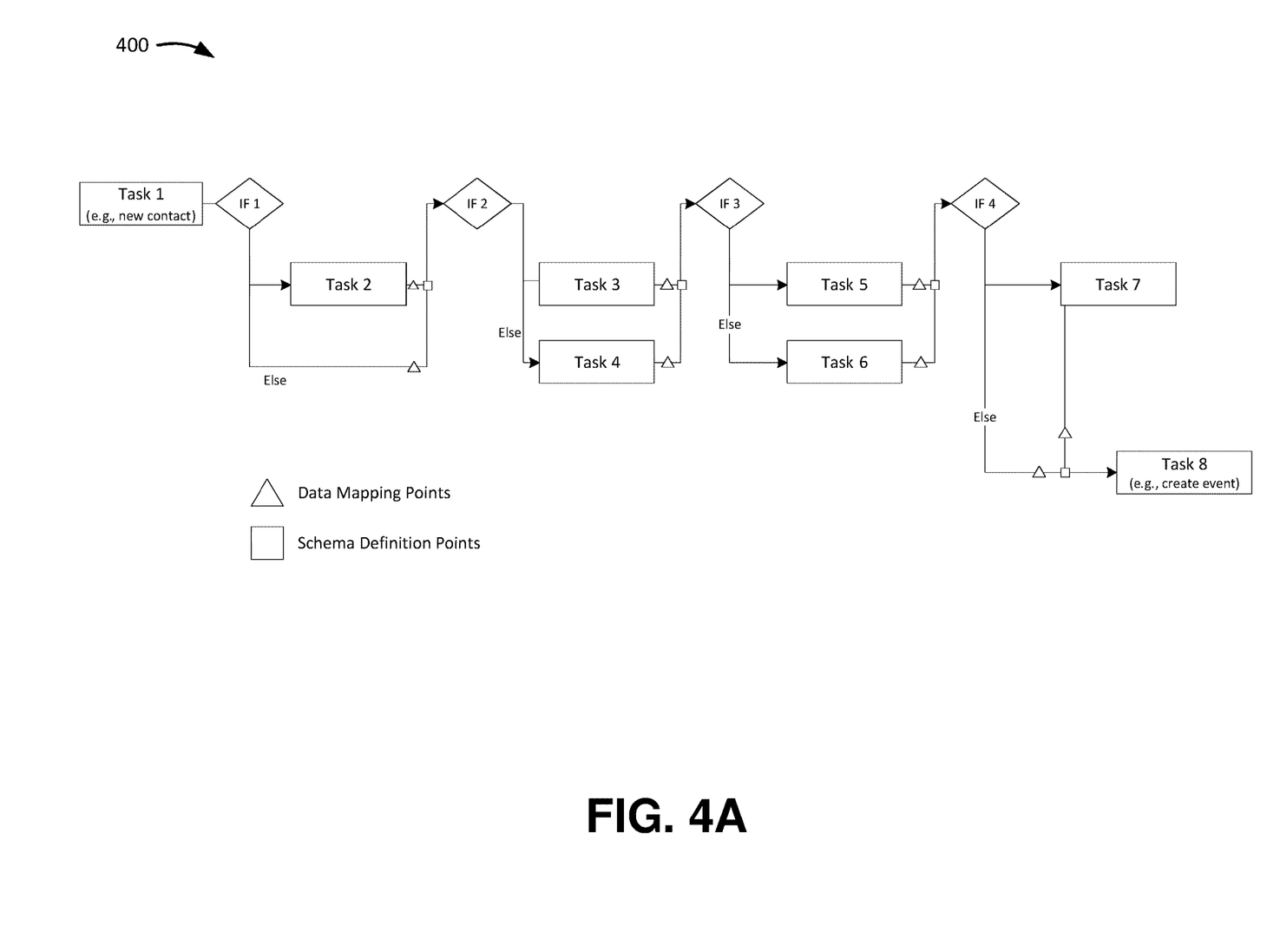
FIGS. 4A-4D show an overview of an example implementation in accordance with aspects of the present invention.

FIGS. 4A-4D show an overview of an example implementation in accordance with aspects of the present invention. In FIGS. 4A-4D, a workflow 400 is presented via a workflow management tool or application (e.g., running on a computing device). The workflow 400 may be authored by a workflow author or user using the workflow management tool. As shown in FIG. 4A, the workflow 400 may include a series of tasks or instructions. As an example, the workflow 400 may include a series of tasks for generating a new contact (e.g., for an address book) with a starting node of task 1. As shown in FIG. 4, multiple paths may exist between the starting node of task 1, and the terminating node of task 8 depending on the conditions of the output data at each of the intervening nodes. For example, one path from task 1 to task 8 would be: task 1, task 2, task 3, task 5, task 7, task 8.

Another path would be task 1, task 2, task 4, task 6, task 7, and task 8. Since four "IF" nodes exist (in which that data can take different paths), the number of paths would be 2^4 paths, i.e., 16 paths. Aspects of the present invention may apply to any type of workflow, including a workflow that generates response at a terminating node, and returns the response to user, other application, and/or system. Additionally, or alternatively, aspects of the present invention may apply to a trigger-action flow, Typically, the author of the workflow 400 would be required to define and map the data for all 16 paths, which would be cumbersome, laborious, and potentially inaccurate/error-prone since mapping the data would require extensive knowledge of each data output by each node and their schemas. Accordingly, aspects of the present invention may simplify the mapping of responses based on schema definitions at convergence points (represented by square notations, and data mappings at workflow node outputs that use the defined schemas represented by triangle notations). In this way, the user or author of the workflow 400 is no longer required to define response mappings for each path in the workflow 400. Further, aspects of the present invention allows the user or author to more easily map data into any node of a workflow that requires data input without requiring the user to map data from all paths into a node.

Figure 4B:
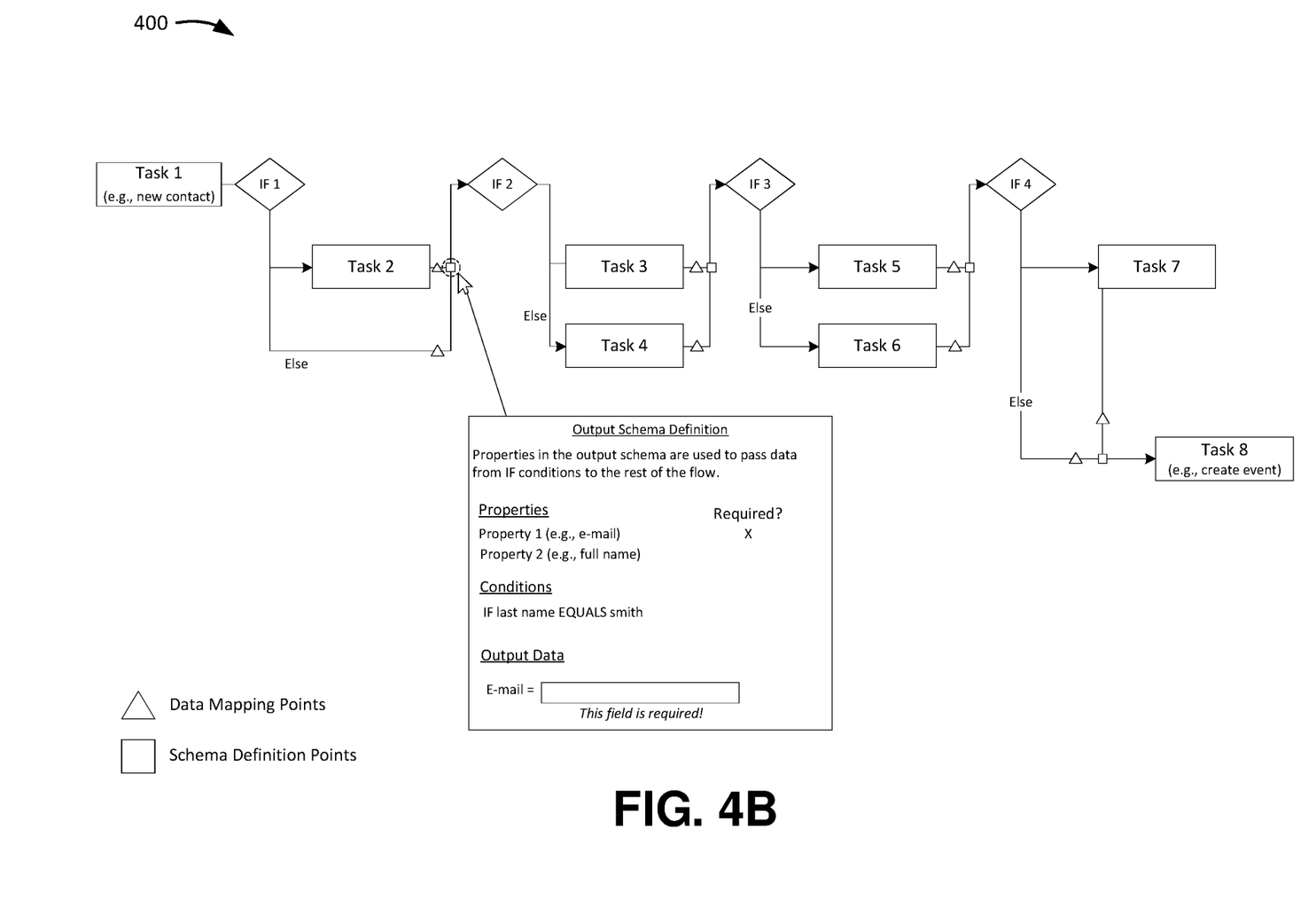

Referring to FIG. 4B, an output schema dialogue box may be presented to receive inputs for defining a schema for an IF node (e.g., the IF 1 node). The dialogue box may be used to receive definitions of properties of data that is passed from the IF node to the rest of the flow. Example properties may include an e-mail address, a full name, etc. The output schema definition dialogue box may also be used to receive input of which properties are required to be defined in the output data from the IF node. The output schema dialogue box may also be used to receive condition definitions that define the output data when the condition is met. The output schema dialogue box may also be used to define mapping parameters or fields that the user indicates are required, and the dialogue box may display an error when a required or non-optional parameter is missing. In summary, the output schema dialogue box may be used to receive, from the author, inputs that define an output schema for the "IF-ELSE" convergence point of the "IF 1" node. As described herein, definition of schemas at each convergence point eliminates the need to define response mappings at each path (e.g., each of the 16 paths in the example workflow 400) since the defined schema would be used and applied to the data mapped at each node output.

Figure 4C:
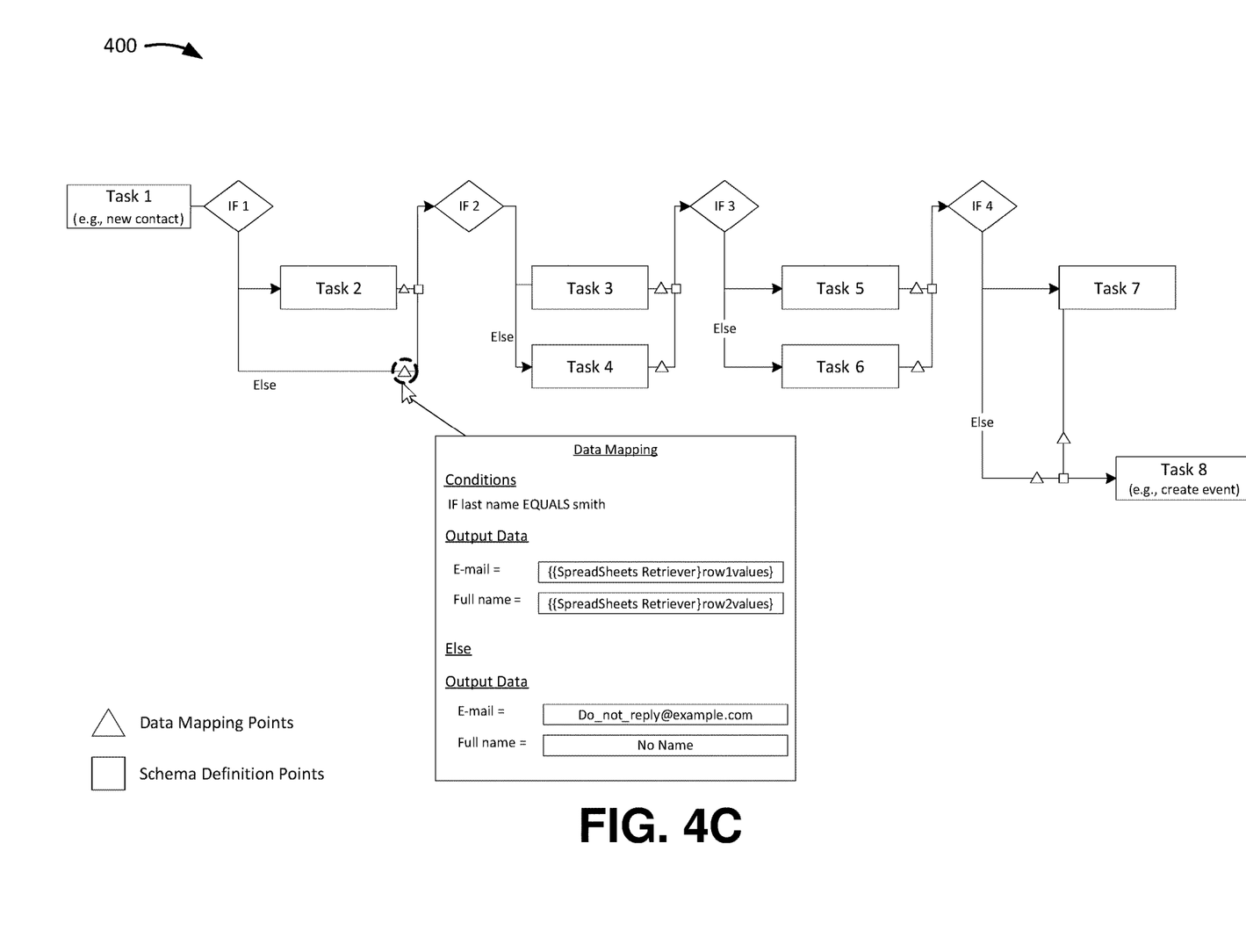

Referring to FIG. 4C, a data mapping dialogue box may be presented to receive inputs for defining data mappings at an output node. In the example shown, the data mapping dialogue box may be used to receive inputs to define the output data from the "task 1" node after the "IF 1" node. The data mapping dialogue may identify the conditions corresponding to the "IF 1" node, and the output data for each condition met. As can be seen, the output data would be in the same schema as that defined previously at the schema definition phase shown in FIG. 4B.

Figure 4D:
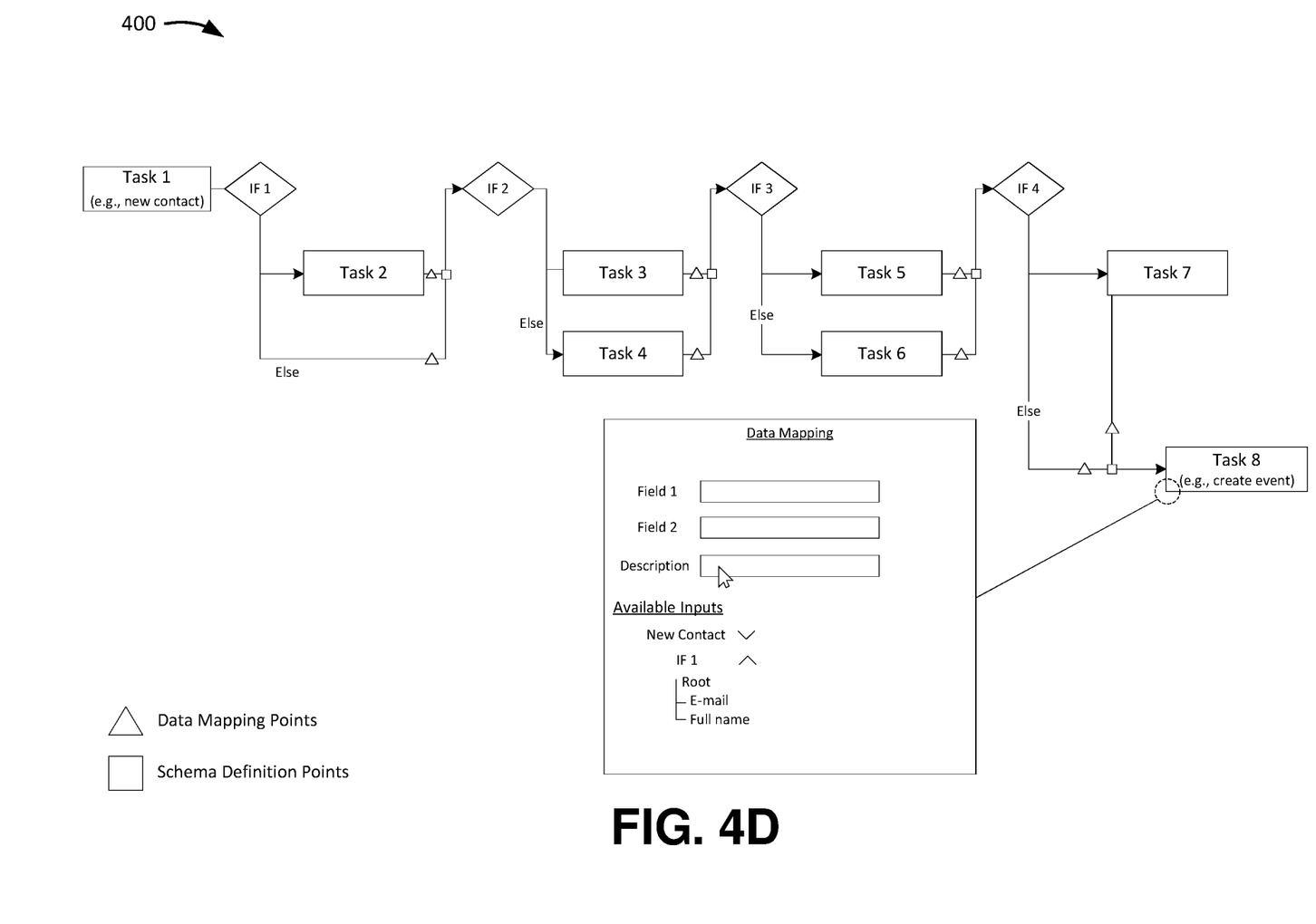

Referring to FIG. 4D, a data mapping dialogue box may be presented to receive inputs for defining data mappings at other nodes in the workflow 400 (e.g., at the terminating node "task 8"). As shown in FIG. 4D, the data mapping dialogue box may include a series of fields via which the author may map data. In embodiments, the data can be inputted using the data mapped from other nodes in the workflow 400. For example, in the "description" field, data can be populated using the available inputs (e.g., data in the schemas that was defined previously in FIGS. 4B and 4C from the "IF 1" node). As shown, a menu of available inputs may be presented that show the previously mapped data. In embodiments, the available inputs may include only those inputs or data mappings from an IF node having a defined schema, thereby avoiding a situation in which the user would be required to define data mappings for all the paths in the workflow. Further, the data is inputted in accordance with the schema defined at the "IF 1" convergence point. As more schemas and data mappings are defined at other convergence points and output puts in the workflow 400, those data mappings will be available for populating data mapping fields at various points in the workflow 400. In this way, it is no longer necessary for the user to manually map every path in the workflow 400.

In embodiments, fields for data mapping at any point or node in the workflow 400 may be auto-populated based on defined schemas and defined data mappings at other points in the workflow. The values in the auto-populated fields may then be viewed and adjusted as desired or needed to modify and adjust the operations of the workflow 400 based on the adjusted values. For example, fields may be auto-populated based on data defined in the output schema from a connecting IF node. Also, same or similar fields that had data defined in a prior schema can be auto-populated in other areas of the workflow 400.

As described herein, aspects of the present invention may receive user input through a workflow management tool for defining schemas at convergence points, and receive user input defining data mapping inputs that are structured in accordance with the schemas. Once the data mapping inputs are received, the workflow 400 may be executed based on the data mapping inputs to perform a task, which may involve invoking one or more applications hosted on application servers using application programming interface (API) calls. Also, since it is no longer necessary for the user to manually map every path in a workflow a, the workflow may include a significantly large number of IF nodes and have a high degree of complexity. As such, the functioning of computing applications may be improved by accounting for higher number of scenarios and conditional statements. While FIGS. 4A-4D show an example of a workflow with four IF nodes (e.g., four conditionals), aspects of the present invention may be applied to workflows having any number of IF nodes.

Also, while the example of FIGS. 4A-4D show data mapping for task 8 in workflow 400, aspects of the present invention allow the user or author to more easily map data into any node or task of the workflow 400 that requires data input without requiring the user to map data from all paths into a node. As an example, the data input mapping for task 5 will map from the context that is present in the flow at the entry to task 5. More specifically, the context that is present in the flow at the entry to task 5 is the output of task 1 plus the output schema present on the exit of the "IF1" node plus the output schema from the "IF2" node.

FIG. 5 shows an example environment in accordance with aspects of the present invention. As shown in FIG. 5, environment 500 may include a workflow management server 210, one or more application servers 220, and network 230. In embodiments, one or more components in environment 500 may correspond to one or more components in the cloud computing environment of FIG. 2. In embodiments, one or more components in environment 500 may include the components of computer system/server 12 of FIG. 1.

The workflow management server 210 may include one or more computing devices (e.g., such as computer system/server 12 of FIG. 1) that hosts a workflow management tool or application for building a workflow (e.g., such as the workflow 400 of FIG. 4). In embodiments, the workflow management server 210 may provide a user interface to allow a user or author to build the workflow, and define schemas and data mappings throughout the workflow using the processes described herein.

The application server 220 may include one or more computing devices (e.g., such as computer system/server 12 of FIG. 1) that may facilitate the execution of one or more tasks in a workflow. For example, the application server 220 may include an e-mail hosting server, a game hosting server, a financial data hosting server, a social-media hosting server, a content streaming server, or the like. The workflow management server 210 may communicate with different application servers 220 to receive data in conjunction with performing a task within a workflow.

The network 230 may include network nodes, such as network nodes 10 of FIG. 2. Additionally, or alternatively, the network 230 may include one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
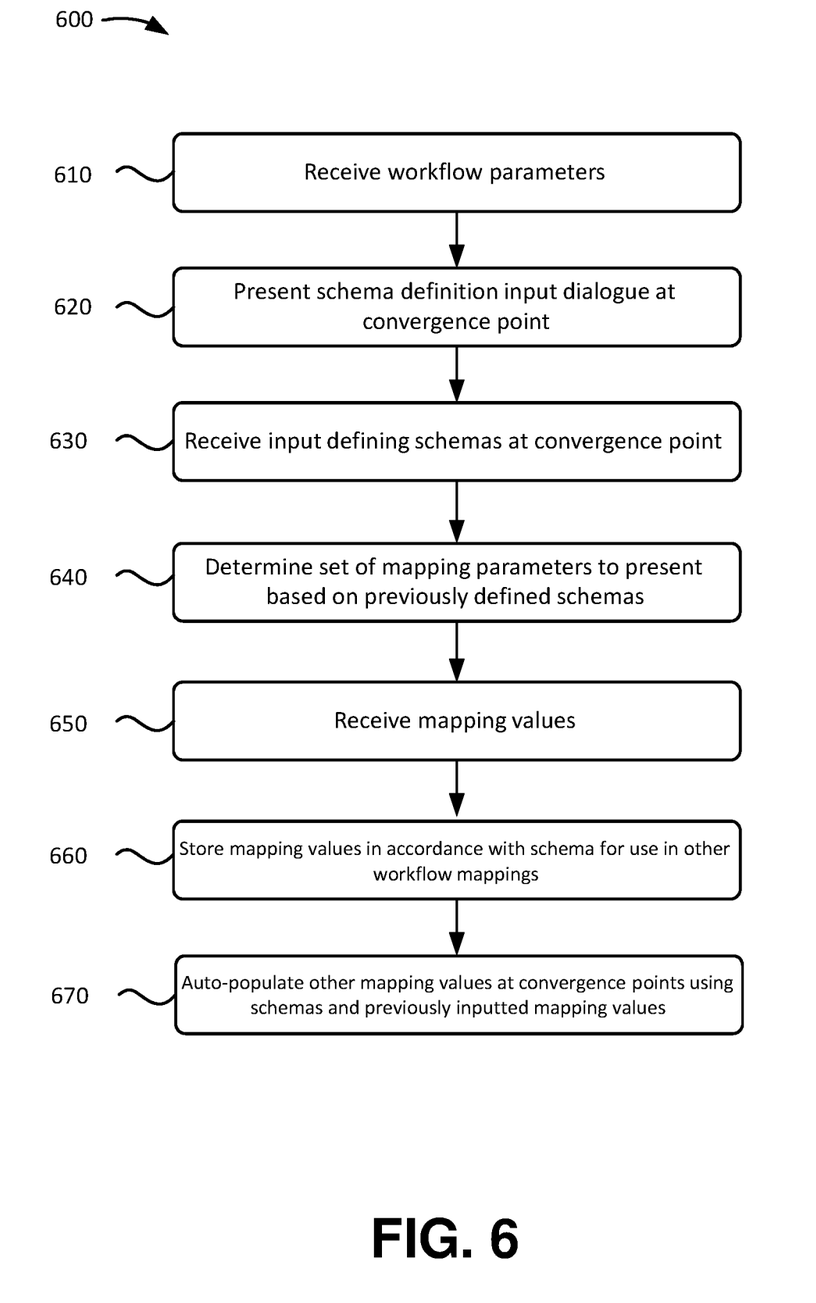
FIG. 6 shows an example flowchart of a process for streamlining the definition of schemas and data mappings for a complex workflow in accordance with aspects of the present invention.

FIG. 6 shows an example flowchart of a process for streamlining the definition of schemas and data mappings for a complex workflow in accordance with aspects of the present invention. The steps of FIG. 6 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 6, process 600 may include receiving workflow parameters (step 610). For example, the workflow management server 210 may receive workflow parameters from an author for creating a workflow (e.g., the workflow 400 of FIG. 4A, or another workflow). In embodiments, the workflow management server 210 may present a user interface associated with a workflow creation and management application to receive user input defining the workflow parameters (e.g., the tasks, nodes, conditions, and associated parameters).

Process 600 may also include presenting a schema definition input dialogue at a convergence point (step 620). For example, the workflow management server 210 may present a schema definition input dialogue box at a convergence point within the workflow. The schema definition input dialogue box may be similar to that shown in FIG. 4B, or may have some other format. In embodiments, the workflow management server 210 may present the schema definition input dialogue box after receiving a selection of the convergence point.

Process 600 may further include receiving input defining a schema at the convergence point (step 630). For example, the workflow management server 210 may receive input defining the schema from the author via the user interface. In embodiments, the schema may identify properties that are used to pass data from IF conditions in the workflow to the rest of the nodes in the workflow.

Process 600 may also include determining a set of data mapping parameters to present based on previously defined schemas (step 640). For example, the workflow management server 210 may determine a set of mapping parameters that may be defined at the outputs of each node. The set of mapping parameters may conform to the schemas previously defined at the convergence point (e.g., at step 630). For example, the set of mapping parameters may include the properties defined by the schema.

Process 600 may further include receive mapping values (step 650). For example, as the workflow management server 210 may receive, from the author via the user interface, input values to the mapping parameters. The values may be data that is output after a node or IF condition, and is in the format of the schema previously defined (e.g., at step 630).

Process 600 may also include storing the mapping values in accordance with the schema for use in other workflow mappings (step 660). For example, the workflow management server 210 may store the received mapping values (received at step 650). In embodiments, the mapping values may be stored in a structure corresponding to the schema. The stored mapping parameters may be used as inputs to data mapping parameters at other points in the workflow (e.g., as shown in FIG. 4D).

Process 600 may further include auto-populating other data mapping values at convergence points using schemas and previously inputted mapping values (step 670). For example, the workflow management server 210 may receive an instruction via the user interface to auto-populate data mapping values at a convergence point using a schema associated with that convergence point and previously inputted mapping values. As an example, the workflow management server 210 may determine which data mapping values are best suited for a convergence point based on the context of the data or type of data associated with the task or node. Once auto-populated, the author may accept or modify the auto-populated data as needed or desired.

In embodiments, process 600 may be repeated until all schemas at all convergence points in the workflow have been defined, and all data mappings at the output of each node have been defined. In embodiments, the workflow management server 210 may display an error when input values are not received for non-optional mapping parameters. In embodiments, the workflow may be executed once the schemas and data mappings have been defined. As described herein, aspects of the present invention may eliminate the need to manually map response data for each path in a workflow. Instead, only data at outputs of nodes may need to be mapped, and only schemas at convergence points may need to be mapped. Further, mapped data at one output in the workflow can be used to auto-populate data at another output in the workflow. As a result, the amount of data that is needed to be mapped is significantly reduced in relation to when data is mapped to each path in the workflow. Specifically, a number of points in the workflow in which a user may define schemas an input mapping values is substantially less than a number of paths in the workflow.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a computing device, user input defining a workflow;
   receiving, by the computing device, information defining schemas at convergence points in the workflow, the convergence points being points in the workflow at which two or more workflow node outputs converge;
   determining, by the computing device, a set of mapping parameters at outputs of nodes of the workflow based on the schemas;
   presenting a menu of available inputs to map a subset of the mapping parameters, wherein the available inputs include previously defined data mappings, wherein the available inputs include only inputs from an IF node in the workflow that have a schema defined;
   receiving, by the computing device, input values to the mapping parameters;

storing, by the computing device, the input values to the mapping parameters in a structure corresponding to the schemas;

executing, by the computing device, the workflow based on the input values to the mapping parameters, wherein the executing includes invoking one or more applications residing on one or more application servers through application programming interface (API) calls; and auto-populating, by the computing device, a subset of the input values to the mapping parameters of a particular node in the workflow, wherein the subset of the input values is from a node in the workflow other than a node in the workflow that is directly connected to the particular node.

2. The method of claim 1, wherein a number of points in the workflow for defining the schemas and inputting the input values to the mapping parameters is less than a number of paths in the workflow.

3. The method of claim 1, wherein the workflow is associated with a data record generation and storage application.

4. The method of claim 1, wherein the previously defined data mappings are structured in accordance with the schema.

5. The method of claim 1, wherein the workflow includes at least two IF nodes in a series,
one of the convergence points is a point in the workflow where outputs from two task nodes converge, and
an input of each of the two task nodes is an output of one of the IF nodes.

6. The method of claim 1, wherein a service provider performs at least one selected from the group consisting of: creates the computing device, maintains the computing device, deploys the computing device, and supports the computing device.

7. The method of claim 1, wherein the receiving the user input defining the workflow, the receiving the information defining the schemas, the determining the set of mapping parameters, the receiving the inputs to the mapping parameters, the storing the mapping parameters, and the executing the workflow are provided by a service provider on a subscription, advertising, and/or fee basis.

8. The method of claim 1, wherein the computing device includes software provided as a service in a cloud environment.

9. The method of claim 1, further comprising deploying a system for simplifying data mapping in complex flows, comprising providing a computer infrastructure operable to perform the receiving the user input defining the workflow, the receiving the information defining the schemas, the determining the set of mapping parameters, the receiving the inputs to the mapping parameters, the storing the mapping parameters, and the executing the workflow.

10. The method of claim 1, wherein a first schema of the schemas is defined at a first convergence point of the convergence points,
a first output of the workflow node outputs is an output of a first node of the nodes of the workflow,
a second output of the workflow node outputs is an output of a second node of the nodes of the workflow, the second node being directly downstream in the workflow from the first node and directly downstream in the workflow from the first convergence point, and
mapping parameters at the second output include only mapping parameters of the first schema and mapping parameters of the first output.

11. A computer program product for data mapping in complex flows, the computer program product comprising a computer readable storage medium having program instructions embodied therewith, the program instructions executable by a computing device to cause the computing device to:
receive, via a user interface of a workflow management application, user input for constructing a workflow;
receive, via the user interface, user input that defines schemas at convergence points in the workflow, the convergence points being points in the workflow at which two or more workflow node outputs converge;
receive, via the user interface, input values to mapping parameters defining output data at nodes in the workflow, wherein the input values to the mapping parameters include only the output data at nodes in the workflow and output of the schemas at the convergence points;
store the input values to the mapping parameters in a structure corresponding to the schemas at respective nodes;
auto-populating a subset of the input values to the mapping parameters of a particular node in the workflow, wherein the subset of the input values is from a node in the workflow other than a node in the workflow that is directly connected to the particular node; and
execute the workflow based on the input values to the mapping parameters,
wherein the user input that defines schemas includes defining the mapping parameters of each path into each of the convergence points.

12. The computer program product of claim 11, wherein a number of points in the workflow for defining the schemas and inputting the input values to the mapping parameters is less than a number of paths in the workflow.

13. The computer program product of claim 11, wherein the program instructions further cause the computing device to display an error when input values to mapping parameters for non-optional mapping parameters are not received.

14. The computer program product of claim 11, wherein the program instructions further cause the computing device to present a menu of available inputs to map a subset of the mapping parameters, wherein the available inputs include previously defined data mappings and include only inputs from an IF node in the workflow that have a schema defined.

15. The computer program product of claim 11, wherein the program instructions further cause the computing device to present to a user an output schema dialogue box on the user interface,
the program instructions further cause the computing device to receive condition definitions through the dialogue box on the user interface, the condition definitions defining the output data in response to particular conditions being met,
the receiving the user input that defines schemas at convergence points in the workflow is through the dialogue box on the user interface, and
the receiving the input values to the mapping parameters is through the dialogue box on the user interface.

16. A system comprising:
a CPU, a computer readable memory and a computer readable storage medium associated with a computing device;
program instructions to present a workflow having a plurality of convergence points, the convergence points being points in the workflow at which two or more workflow node outputs converge;

program instructions to present a plurality of schema definition dialogue boxes, wherein each of the plurality of schema definition dialogue boxes receive user inputs for defining a schema at a respective convergence point;

program instructions to present a plurality of data mapping dialogue boxes, wherein each of the plurality of data mapping dialogue boxes receive user inputs for defining data mapping values at a respective output of a node in the workflow, wherein the data mapping values are structured in accordance with the schema;

program instructions to auto-populate a subset of the input values to the mapping parameters of a particular node in the workflow, wherein the subset of the input values is from a node in the workflow other than a node in the workflow that is directly connected to the particular node, wherein the input values to the mapping parameters include only the output of the node in the workflow and output of the schema at the respective convergence point; and program instructions to execute the workflow based on the data mapping values, wherein the program instructions are stored on the computer readable storage medium for execution by the CPU via the computer readable memory.

17. The system of claim 16, wherein a number of points in the workflow for defining schemas in the workflow receiving user inputs for defining data mapping values at output nodes of the workflow is less than a number of paths in the workflow.

\* \* \* \* \*